United States Patent
Wang

(10) Patent No.: US 9,641,272 B2
(45) Date of Patent: May 2, 2017

(54) INTER-RAT INTERFERENCE CANCELLATION

(71) Applicant: QUALCOMM Incorporated, San Diego, CA (US)

(72) Inventor: Jibing Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 14/523,772

(22) Filed: Oct. 24, 2014

(65) Prior Publication Data

US 2016/0119072 A1    Apr. 28, 2016

(51) Int. Cl.
| | | |
|---|---|---|
| H04W 4/00 | (2009.01) | |
| H04J 11/00 | (2006.01) | |
| H04L 27/00 | (2006.01) | |
| H04W 84/12 | (2009.01) | |

(52) U.S. Cl.
CPC ...... *H04J 11/0023* (2013.01); *H04L 27/0012* (2013.01); *H04W 84/12* (2013.01)

(58) Field of Classification Search
CPC .............. H04B 7/2121; H04B 7/2123; H04J 2203/0069; H04Q 2213/394
USPC ........................................ 370/329, 330, 338
See application file for complete search history.

(56) References Cited

U.S. PATENT DOCUMENTS

| | | | |
|---|---|---|---|
| 8,170,487 B2* | 5/2012 | Sahota | ..................... H04B 1/10 455/296 |
| 8,273,618 B2 | 9/2012 | Andreoni et al. | |
| 8,422,265 B2 | 4/2013 | Hui et al. | |
| 8,541,821 B2 | 9/2013 | Batra et al. | |
| 8,686,490 B2 | 4/2014 | Chen | |
| 2007/0184782 A1* | 8/2007 | Sahota | .................. H04B 1/525 455/63.1 |
| 2008/0273552 A1 | 11/2008 | Kim et al. | |
| 2009/0086863 A1 | 4/2009 | Komninakis et al. | |
| 2009/0189215 A1 | 7/2009 | Samanta et al. | |

(Continued)

FOREIGN PATENT DOCUMENTS

EP    2288061 A1    2/2011

OTHER PUBLICATIONS

ISA/EPO, International Search Report and Written Opinion of the International Searching Authority, Int'l. App. No. PCT/US2015/052579, Dec. 14, 2015, European Patent Office, Rijswijk, NL, 13 pgs.

*Primary Examiner* — Chuong T Ho

(74) *Attorney, Agent, or Firm* — Holland & Hart LLP

(57) ABSTRACT

Methods, systems, and devices are described for eliminating interference from a convoluted signal comprising several signals of different radio access technologies (RATs), such as a Long Term Evolution (LTE) signal and wireless local area network (WLAN) signal, in an unlicensed or shared radio frequency spectrum band are described. In accordance with the present disclosure, a dual-radio mobile device may utilize a multiple radios to assist in the operation of interference cancellation. Specifically, in some examples, a first radio (e.g., WLAN radio) may process the received convoluted signal to reconstruct a first signal (e.g., WLAN signal). The reconstructed first signal may be utilized by a second radio (e.g., LTE radio) to identify a second signal (e.g., LTE signal) in the received convoluted signal by cancelling or removing the reconstructed first signal from the convoluted signal.

27 Claims, 13 Drawing Sheets

(56) References Cited

U.S. PATENT DOCUMENTS

| | | | |
|---|---|---|---|
| 2013/0114437 A1* | 5/2013 | Yoo | H04J 11/005 370/252 |
| 2013/0115988 A1 | 5/2013 | Sun et al. | |
| 2013/0128778 A1* | 5/2013 | Bennett | H04W 36/08 370/277 |
| 2013/0337761 A1 | 12/2013 | Kyperountas et al. | |
| 2014/0098773 A1 | 4/2014 | Yoo et al. | |
| 2015/0043687 A1* | 2/2015 | Luo | H04B 1/006 375/349 |
| 2015/0200697 A1* | 7/2015 | Wang | H04B 1/123 455/310 |

* cited by examiner

INTER-RAT INTERFERENCE CANCELLATION

BACKGROUND

Field of Disclosure

The following relates generally to wireless communication, and more specifically to inter-radio access technology (RAT) interference cancellation.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., an LTE system).

By way of example, a wireless multiple-access communications system may include a number of base stations, each simultaneously supporting communication for multiple communication devices, which may be otherwise known as user equipment (UEs), mobile devices or stations (STAs). A base station may communicate with the communication devices on downlink channels (e.g., for transmissions from a base station to a UE) and uplink channels (e.g., for transmissions from a UE to a base station).

As cellular networks have become more congested, operators are beginning to look at ways to increase capacity. One approach may include the use of wireless local area networks (WLANs) to offload some of the traffic or signaling of a cellular network. Additionally, operators may seek to utilize unlicensed spectrum, traditionally used for WLAN, for cellular technology. But this increasing demand for unlicensed spectrum can lead to undesirable interference, which may impact certain radio access technologies (RATs) more than others.

SUMMARY

Systems, methods, and apparatuses for eliminating interference from a convoluted signal are described. In accordance with the present disclosure, a dual-radio mobile device may utilize multiple radios for interference cancellation. In some examples, a first radio (e.g., WLAN radio) may process a received convoluted signal to reconstruct a first signal (e.g., WLAN signal). The reconstructed first signal may be utilized by a second radio (e.g., LTE radio) to identify a second signal (e.g., LTE signal) by cancelling or removing the reconstructed first signal from the convoluted signal.

A method of wireless communication at a UE is described. The method may include receiving a convoluted signal including a plurality of RAT waveforms over a shared channel, reconstructing a first signal of a first RAT waveform from the plurality of RAT waveforms with a first radio, and identifying a second signal of a second RAT waveform from the plurality of RAT waveforms with a second radio based on the reconstructed first signal.

An apparatus for wireless communication at a UE is also described. The apparatus may include a receiver for receiving a convoluted signal including a plurality of RAT waveforms over a shared channel, a packet reconstructor for reconstructing a first signal of a first RAT waveform from the plurality of RAT waveforms with a first radio, and a signal identifier for identifying a second signal of a second RAT waveform from the plurality of RAT waveforms with a second radio based on the reconstructed first signal.

A further apparatus for wireless communication at a UE is also described. The apparatus may include means for receiving a convoluted signal including a plurality of RAT waveforms over a shared channel, means for reconstructing a first signal of a first RAT waveform from the plurality of RAT waveforms with a first radio, and means for identifying a second signal of a second RAT waveform from the plurality of RAT waveforms with a second radio based on the reconstructed first signal.

A non-transitory computer-readable medium storing code for wireless communication at a UE is also described. The code may include instructions executable to receive a convoluted signal including a plurality of RAT waveforms over a shared channel, reconstruct a first signal of a first RAT waveform from the plurality of RAT waveforms with a first radio, and identify a second signal of a second RAT waveform from the plurality of RAT waveforms with a second radio based on the reconstructed first signal.

Some examples of the method, apparatuses, or non-transitory computer-readable medium described above may further include features, means, or instructions for determining that an interference level associated with the convoluted signal is greater than or equal to a threshold, and generating the reconstructed first signal of the first RAT waveform based on the determining. Additionally or alternatively, some examples may include features, means, or instructions for sending an indication to generate the reconstructed first signal from the second radio to the first radio.

Some examples of the method, apparatuses, or non-transitory computer-readable medium described above may further include features, means, or instructions for determining the interference level associated with the convoluted signal including identifying a SINR of the convoluted signal. Additionally or alternatively, some examples may include features, means, or instructions for determining that an interference level associated with the convoluted signal is less than a threshold, and sending an indication to cease signal reconstruction from the second radio to the first radio.

Some examples of the method, apparatuses, or non-transitory computer-readable medium described above may further include features, means, or instructions for decoding the convoluted signal with the first radio, and reconstructing with the first radio a portion of the convoluted signal to generate the first signal. Additionally or alternatively, some examples may include features, means, or instructions for identifying a modulation or coding scheme for the convoluted signal, and demodulating a portion of the convoluted signal based on the modulation or encoding scheme.

Some examples of the method, apparatuses, or non-transitory computer-readable medium described above may further include features, means, or instructions for cancelling the reconstructed first signal of the first RAT waveform from the convoluted signal. Additionally or alternatively, in some examples, the first radio includes a modem, which may include a receiver and a packet reconstructor.

In some examples of the method, apparatuses, or non-transitory computer-readable medium described above, the first radio includes a WLAN modem. Additionally or alternatively, in some examples, the second radio includes a LTE receiver.

In some examples of the method, apparatuses, or non-transitory computer-readable medium described above, the first signal is a WLAN signal and the second signal is a LTE signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
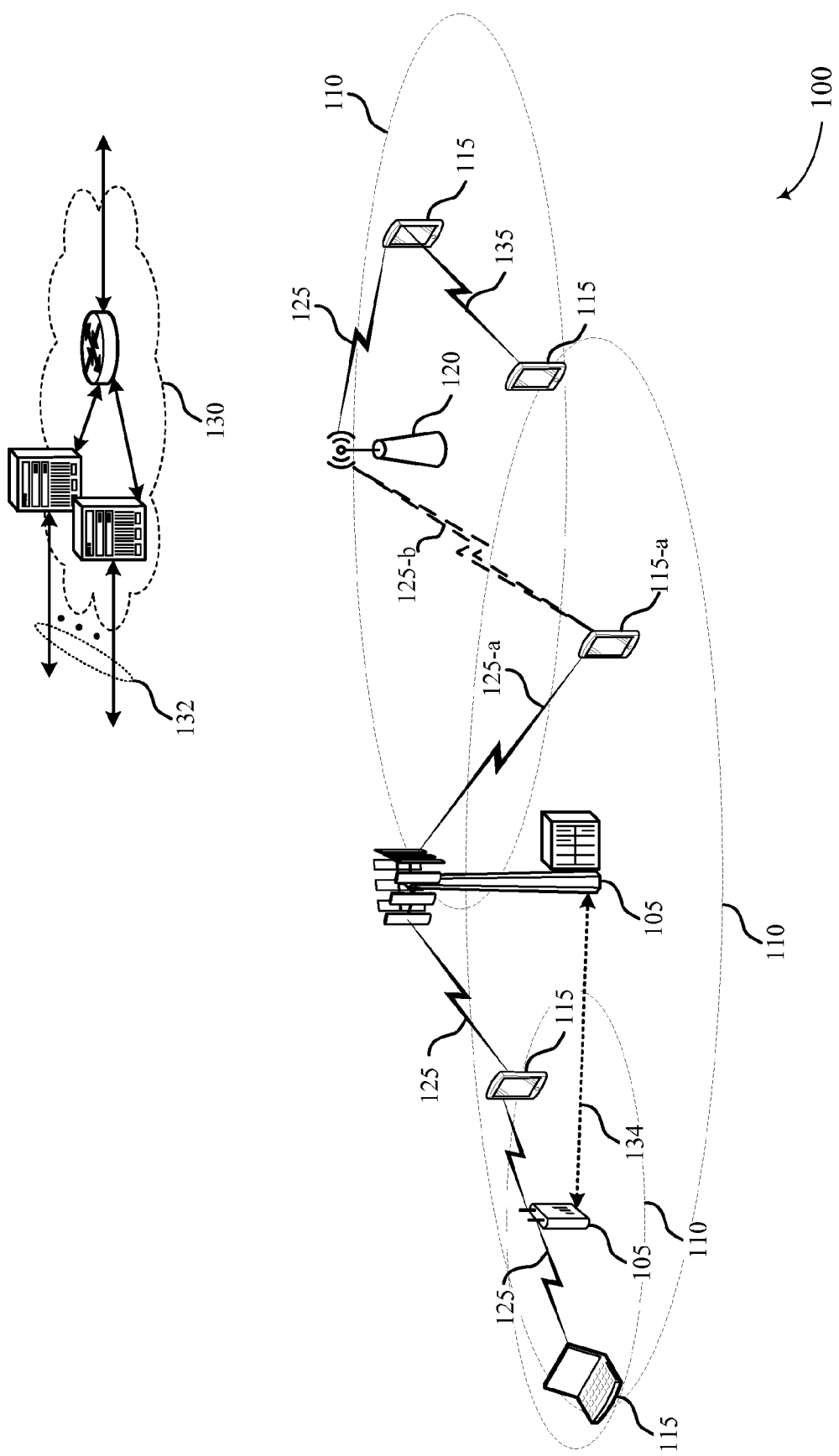
FIG. 1 illustrates an example of a wireless communications system for inter-RAT interference cancellation in accordance with various aspects of the present disclosure.

When traffic is offloaded from a licensed radio frequency spectrum band of a cellular network (e.g., an LTE network) to an unlicensed or shared radio frequency spectrum band (e.g., band used by WLAN networks), interference between the cellular and WLAN signals may occur. That is, due to an overlap in time or frequency resources of the cellular and WLAN signals, for example, a signal from one network (e.g., the WLAN network) may appear as interference to a radio configured to receive signals from the other network (e.g., the cellular network). In some examples, the interference may be a result of a device operating receiver modules of different RATs within a shared or unlicensed spectrum. The present disclosure thus provides techniques for removing interference signals of one RAT (e.g., WLAN signal) from signals of another RAT (e.g., cellular signals).

A mobile device, for example, may be configured with multiple receivers (e.g., radios) of different RATs and may receive, at each receiver, a convoluted signal that includes a desired signal of one RAT and a noise component of another RAT. The mobile device may, however, utilize the receiver of one RAT to receive and process the convoluted signal in conjunction with the receiver of another RAT. For instance, the convoluted signal may include an interlaced LTE signal and a WLAN signal, and a device may include LTE and WLAN radios. In accordance with the present disclosure, the mobile device may utilize the WLAN radio to decode a WLAN component of the convoluted signal by reconstructing the WLAN signal interlaced with the LTE signal. The WLAN radio may send the reconstructed WLAN signal to the LTE radio. The LTE radio, which may have separately received the convoluted signal, may utilize the reconstructed WLAN signal to cancel the WLAN component from the convoluted signal, leaving a clean LTE signal for the LTE radio to process.

Additionally or alternatively, the mobile device may support multiple modes of operation for inter-RAT interference cancellation. In some examples, the mobile device may either enable or disable the inter-RAT interference cancellation based on the strength of the interference signal. For example, if an LTE radio identifies significant interference on a channel (e.g., interference at or above a threshold the LTE radio can process), the mobile device may enable the WLAN radio to assist the LTE radio with interference cancellation. Conversely, if the LTE radio identifies inconsequential interference (e.g., below a threshold), the LTE radio may elect to mitigate interference without employing inter-RAT interference cancellation techniques. The mobile device may thus enable or disable the second radio from assisting in interference cancellation techniques based on the detected interference levels.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 for inter-RAT interference cancellation in accordance with various aspects of the present disclosure. The system 100 includes base stations 105, access points (AP) 120, mobile devices 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 and AP 120 may perform radio configuration and scheduling for communication with the mobile devices 115, or may operate under the control of a base station controller (not shown). In various examples, the base station 105 and AP 120 may communicate, either directly or indirectly (e.g., through core network 130), with each other over backhaul links 134 (e.g., X1, etc.), which may be wired or wireless communication links.

The base station 105 and AP 120 may wirelessly communicate with the mobile device 115 via one or more antennas. Each of the base station 105 and AP 120 may provide communication coverage for a respective geographic coverage area 110. In some examples, base station 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 and AP 120 may be divided into sectors making up only a portion of the coverage area (not shown). The wireless communications system 100 may include base station 105 and AP 120 of different types (e.g., macro or small cell base stations). There may be overlapping geographic coverage areas 110 for different technologies.

While the mobile devices 115 may communicate with each other through the base station 105 and AP 120 using communication links 125, each mobile device 115 may also communicate directly with one or more other mobile devices 115 via a direct wireless link 135. Two or more mobile devices 115 may communicate via a direct wireless link 135 when both mobile devices 115 are in the geographic coverage area 110 or when one or neither mobile device 115 is within the AP geographic coverage area 110. Examples of direct wireless links 135 may include Wi-Fi Direct connections, connections established using a Wi-Fi Tunneled Direct Link Setup (TDLS) link, and other P2P group connections. In other implementations, other peer-to-peer connections or ad hoc networks may be implemented within the system 100.

In some examples, the wireless communications system 100 is an LTE/LTE-Advanced (LTE-A) network. In LTE/LTE-A networks, the term evolved node B (eNB) may be generally used to describe the base stations 105, while the term user equipment (UEs) may be generally used to describe the mobile devices 115. The wireless communications system 100 may be a heterogeneous LTE/LTE-A network in which different types of eNBs provide coverage for various geographical regions. The system 100 may, in some examples, also support a WLAN. A WLAN may be a network employing techniques based on the Institute of Electrical and Electronics Engineers (IEEE) 802.11 family of standards ("Wi-Fi"). For example, each eNB or base station 105 and AP 120 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by mobile device 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by mobile device 115 with service subscriptions with the network provider. A femto cell may also cover a small geographic area (e.g., a home) and may provide restricted access by mobile device 115 having an association with the femto cell (e.g., mobile device 115 in a closed subscriber group (CSG), mobile device 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a mobile device 115 and the base stations 105. The RRC protocol layer may also be used for core network 130 support of radio bearers for the user plane data. At the physical (PHY) layer, the transport channels may be mapped to physical channels.

The mobile device 115 may be dispersed throughout the wireless communications system 100, and each mobile device 115 may be stationary or mobile. A mobile device 115 may also include or be referred to by those skilled in the art as a user equipment (UE), mobile station, a subscriber station, STA, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A mobile device 115 may be a cellular phone, a personal digital assistant (PDA), a wireless modem, a wireless communication device, a handheld device, a tablet computer, a laptop computer, a cordless phone, a wireless local loop (WLL) station, or the like. A mobile device may be able to communicate with various types of base stations and network equipment including macro eNBs, small cell eNBs, relay base stations, and the like. The mobile devices 115 may be multi-radio devices employing adaptive scanning techniques. For example, a mobile device 115 may dynamically adapt scanning operations of one of its radios (e.g., LTE radio or a WLAN radio), based on a signal quality of another of its radios.

The communication links 125 shown in wireless communications system 100 may include uplink (UL) transmissions from a mobile device 115 to a base station 105 or AP 120, or downlink (DL) transmissions, from a base station 105 or AP 120 to a mobile device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The communication links 125 may utilize resources of licensed spectrum or unlicensed spectrum, or both. Broadly speaking, the unlicensed spectrum in some jurisdictions may range from 600 Megahertz (MHz) to 6 Gigahertz (GHz). As used herein, the term "unlicensed spectrum" or "shared spectrum" may thus refer to industrial, scientific and medical (ISM) radio bands, irrespective of the frequency of those bands. In some examples, unlicensed spectrum is the U-NII radio band, which may also be referred to as the 5 GHz or 5 G band. By contrast, the term "licensed spectrum" or "cellular spectrum" may be used herein to refer to wireless spectrum utilized by wireless network operators under administrative license from a governing agency.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A mobile device 115 may be configured with multiple downlink CCs and one or more uplink CCs for carrier aggregation. Carrier aggregation may be used with both FDD and TDD component carriers.

In some examples, a dual-radio UE 115-a, includes a WLAN radio (not shown) and LTE radio (not shown) may be configured to concurrently communicate with base station 105 and AP 120 utilizing shared spectrum. As a result, in some examples, the UE 115-a may detect interference from base station 105, AP 120, or other mobile devices 115 operating over the shared spectrum. The UE 115-a may thus receive convoluted signal that include waveforms with an LTE component and a WLAN component. Accordingly, the UE 115-a may remove the interference from the convoluted signal by employing an inter-RAT interference cancellation techniques discussed herein. Specifically, the UE 115-a may enable a radio (e.g., WLAN radio) to reconstruct portion of the interference signal (e.g., WLAN signal) interleaved with a desired signal (e.g., LTE signal). As a result, the reconstructed signal may be removed from the received signal to produce the desired component of the convoluted signal.

Figure 2:
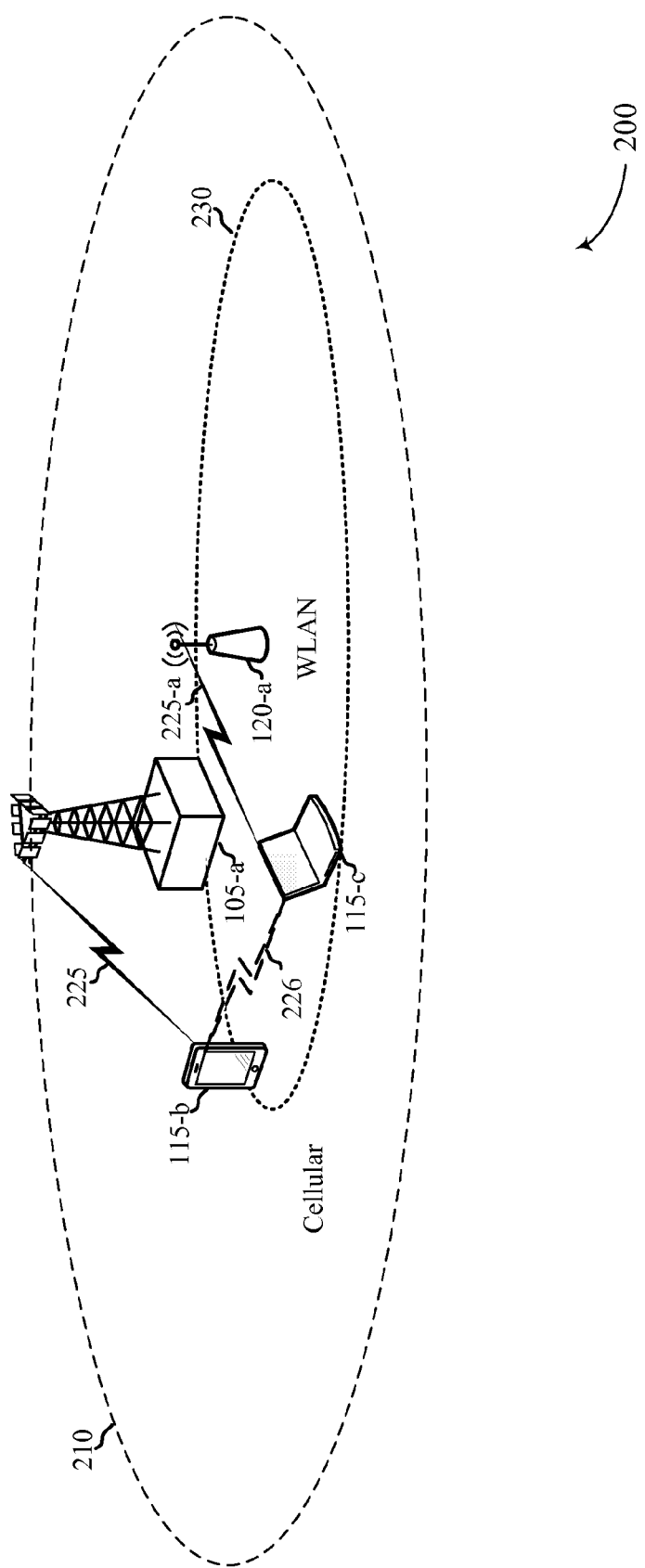
FIG. 2 illustrates an example of a wireless communications system for inter-RAT interference cancellation in accordance with various aspects of the present disclosure.

FIG. 2 illustrates an example of a wireless communications system 200 for inter-RAT interference cancellation in accordance with various aspects of the present disclosure. Wireless communications system 200 may include a UE 115-b and 115-c, which may be an example of a mobile device 115 described above with reference to FIG. 1. Wireless communications system 200 may also include a base station 105-a, which may be an example of a base station 105 described above with reference to FIG. 1. The wireless communications system 200 may also include an AP 120-a, which may be an example of the AP 120 described above with reference to FIG. 1.

During a normal course of operation of the wireless communications system 200, the base station 105-a may communicate with UEs (e.g., UE 115-b) within its coverage area 210, while the WLAN access point 120-a may communicate with UEs (e.g., Wi-Fi device 115-c) within its coverage area 230. When the base station 105-a and the UE 115-b communicate over a licensed radio frequency band a cellular network and the WLAN access point 120-a and UE 115-c communicate over a separate, unlicensed radio frequency band, interference between the communications 225 and 225-a may be largely or completely avoided. But when the base station 105-a/UE 115-b and WLAN access point 120-a/UE 115-c each communicate over the unlicensed frequency band, or other overlapping, there exists a substantially greater potential for interference 226 resulting from the communications 225 and 225-a of the different devices.

One way to reduce the likelihood of interference between devices communicating over the same or overlapping spectrum is to utilize a contention-based protocol, such as Listen Before Talk (LBT) protocol. Under an LBT protocol, a device (e.g., the UE 115-b) wanting to communicate over a channel may listen to the channel to ensure that the channel is "clear" (i.e., ensure that no other device is using the channel), and then broadcast a signal to reserve the channel (e.g., a signal that other devices will interpret as a sign the channel is in use). The device may then ask a device with which it wants to communicate (e.g., the base station 105-a) to also ensure the channel is clear. This may be a result of the different devices 105-a, 120-a having different coverage areas, or as a precaution because, for instance, a device within the coverage area 230 of the first device (e.g., eNB 105-a) may not have received the reservation signal broadcast by the first device.

Despite the use of LBT or other contention-based protocols, scenarios may arise in which the base station 105-a/UE 115-b and the WLAN access point 120-a/UE 115-c simultaneously communicate over the same spectrum (e.g., an unlicensed radio frequency spectrum band). In a system using an unlicensed radio frequency band, receivers that are able to eliminate or mitigate the effects of interference signals (e.g., unwanted WLAN signals) on cellular signals may therefore be desirable. In accordance with the present disclosure, the UEs 115 may utilize inter-RAT interference cancellation techniques remove received interference.

Figure 3:
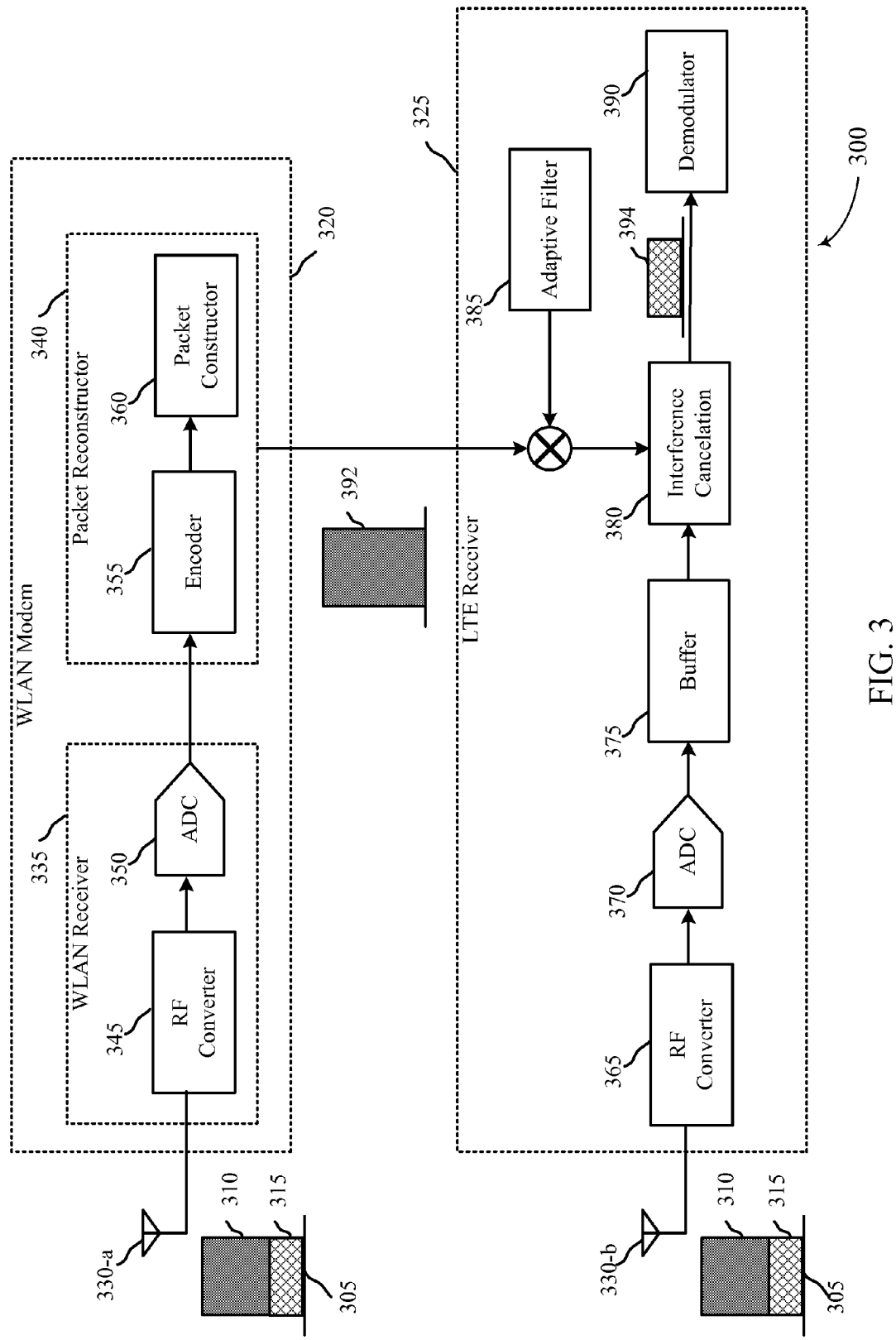
FIG. 3 illustrates an example of a dual-radio mobile device for inter-RAT interference cancellation in accordance with various aspects of the present disclosure.

FIG. 3 illustrates an example of a communication system 300 for utilizing inter-RAT interference cancellation techniques in accordance with various aspects of the present disclosure. The communication system 300 may be an example of a UE 115 described above with reference to FIGS. 1-2. The communication system 300 may include a WLAN modem 320 and LTE receiver 325 co-located at a UE 115.

In one configuration, the WLAN modem 320 and the LTE receiver 325 may receive a convoluted signal 305 at the antenna 330-a and 330-b respectively. In some examples, the convoluted signal may include a Wi-Fi component 310 (e.g., a Wi-Fi waveform) and an LTE component 315 (e.g., an LTE waveform). The LTE receiver 325 may enable inter-RAT interference cancellation mode by determining that the convoluted signal 305 includes an interference signal of another RAT equal to or above a predetermined threshold. If the detected interference signal meets or exceeds the predetermined threshold, the LTE receiver 325 may transmit a message to the WLAN modem 320, directing the WLAN modem 320 to assist the LTE receiver 325 with interference cancellation. Upon receiving a message to assist, the WLAN modem 320 may tune or be tuned to detect the Wi-Fi component 310. Additionally or alternatively, the inter-RAT interference cancellation mode may be disabled if the detected interference signal falls below a predetermined threshold. This ability to enable and disable inter-RAT interference cancellation may allow the system to converse power, by saving system resources (e.g., processing capacity) when inter-RAT interference cancellation is unnecessary.

In some examples, the WLAN modem 320 may include a WLAN receiver 335 and a packet reconstructor 340. The WLAN receiver 335 or the packet reconstructor 340 decodes the convoluted signal 305. The RF converter 345 of the WLAN receiver 335 may, for instance, receive the convoluted signal 305 over a wireless channel of an unlicensed or shared radio frequency band, and it may perform analog filtering of the convoluted signal 305. Following this filtering, the collected signal may be converted to a digital signal (e.g., a plurality of digital samples) by the ADC module 350. The digital samples may be forwarded to the packet reconstructor 340. In some examples, the packet reconstructor 340 may include an encoder 355 and a packet constructor 360, which may employ low-density parity coding (LDCP), inverse Fast Fourier Transforms (IFFT), and packetization (e.g., IEEE 802.11ac packetization). The packet reconstructor 340 may thus encode the digital samples of the signal 305 and reconstruct a received Wi-Fi packet and obtain the Wi-Fi component 310 of the convoluted signal 305. The packet reconstructor 340 may be configured to perform reconstruction without being associated with an access point that transmitted the WLAN component 310. Upon reconstructing the Wi-Fi component 310 of the convoluted signal 305, the packet reconstructor 340 may send the reconstructed Wi-Fi signal 392 to the LTE receiver 325.

Concurrently, the LTE receiver 325 may receive the convoluted signal 305 at antenna 330-b. The RF converter 365 may receive the convoluted signal 305 over a shared spectrum and perform analog filtering on the received signal. Following the filtering, the collection of the received signals may be converted to a digital signal by the ADC module 370 and placed in buffer 375. In some examples, the buffer 375 may be utilized to delay processing of the received signal 305 by the LTE receiver 325 in order to allow the WLAN modem 320 to reconstruct the Wi-Fi signal 392.

Following receipt of the reconstructed Wi-Fi signal 392, the LTE receiver 325 may perform adaptive filtering 385 on the reconstructed Wi-Fi signal 392 and forward the Wi-Fi signal 392 to the interference cancellation module 380. This adaptive filtering may be used by the system 300 to estimate the antenna or analog gain difference between the WLAN Modem 320 and the LTE receiver 325. In some examples, the interference cancellation module 380 removes the Wi-Fi signal 392 from the digital samples of the convoluted signal 305 stored in the buffer 375. The removal of the Wi-Fi component may allow the LTE receiver 325 to generate a clean LTE component 394, which, in turn, may be demodulated by a demodulator 390 and utilized by the system 300.

Figure 4:
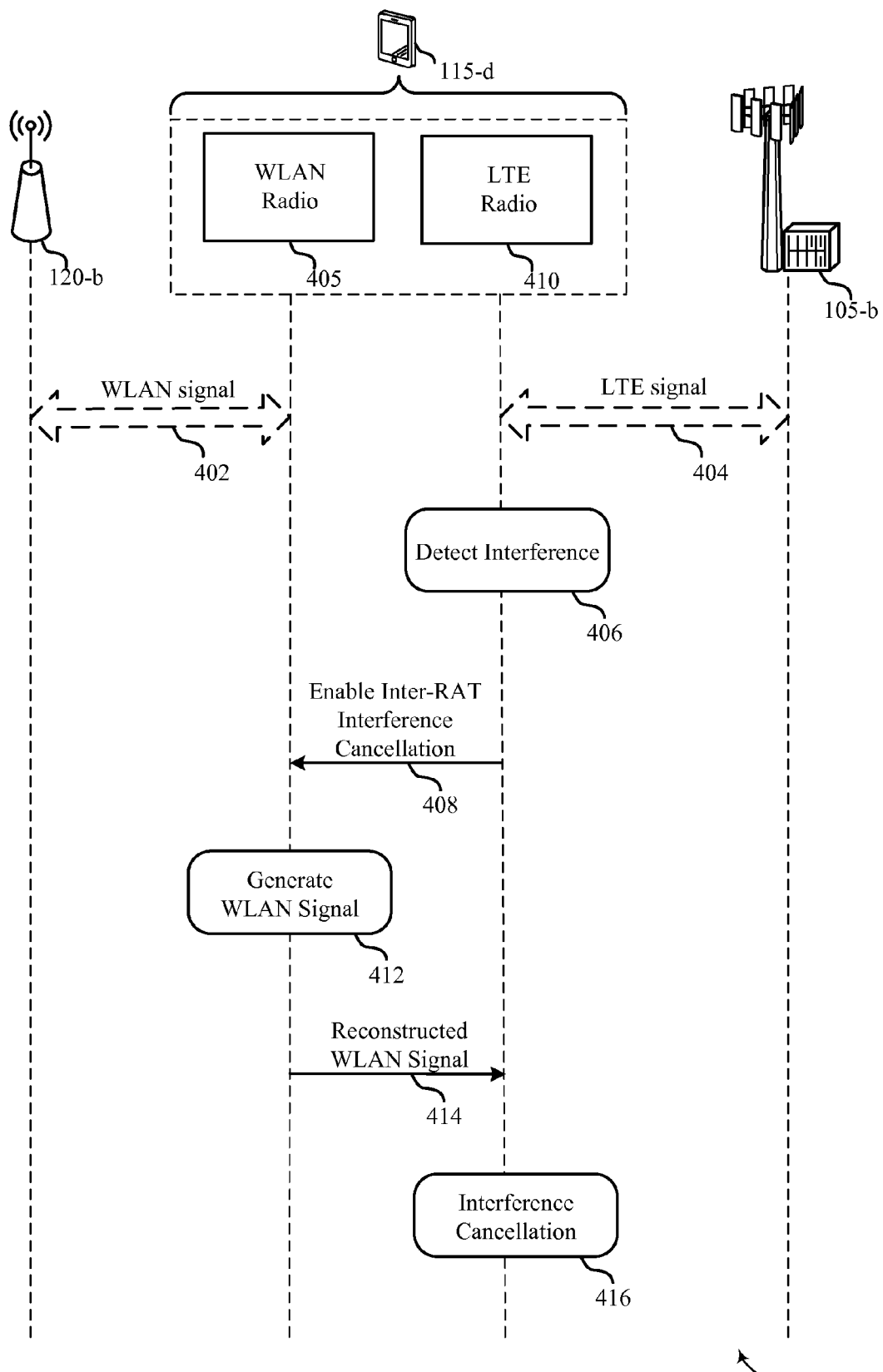
FIG. 4 illustrates an example of a message flow diagram for inter-RAT interference cancellation in accordance with various aspects of the present disclosure.

FIG. 4 illustrates an example of a communication system 400 for inter-RAT interference cancellation in accordance with various aspects of the present disclosure. Communication system 400 may include a UE 115-d, which may be an example of a UE 115 described above with reference to FIGS. 1-2. In some examples, the UE 115-d may include a WLAN radio 405 and LTE radio 410, which may include modems or receivers as described above with reference to FIG. 3. The communication system 400 may also include an access point 120-b and base station 105-b, which may be an examples of access point 120 and base station 105 described above with reference to FIGS. 1-2.

In some examples, the WLAN radio 405 and the LTE radio 410 may communicate with the access point 120-b and base station 105-b over a shared or unlicensed spectrum. Thus, in some examples, the UE 115-d may receive WLAN signals 402 and LTE signals 404, which may overlap in time or frequency, and may thus cause inter-RAT interference. The UE 115-d, upon receiving signals 402 and 404, may detect interference 406 and determine that the interference signal (e.g., WLAN signal 402) exceeds a predetermined threshold level. As a result, the UE 115-d may request enablement of inter-RAT interference cancellation mode by transmitting a notification 408 to the WLAN radio 405 to assist with the interference cancellation.

Based on the enablement notification 408, the WLAN radio 405 may generate the WLAN signal 412 and transmit the reconstructed WLAN signal 414 to the LTE radio 410. In some cases, the LTE radio 410 may identify the LTE signal 504 based on the reconstructed WLAN signal 416 and the remove the WLAN signal 416 from the convoluted signals to produce the LTE signal free of any WLAN signal. Those skilled in the art will recognize that techniques described here are not, however, limited to this example. Rather, a number of inter-RAT interference cancellation schemes may utilize these techniques. For example, the inter-RAT interference cancellation techniques may be adapted to allow the WLAN radio 405 to remove the cellular signal from the WLAN signal, as described with reference to FIG. 5.

Figure 5:
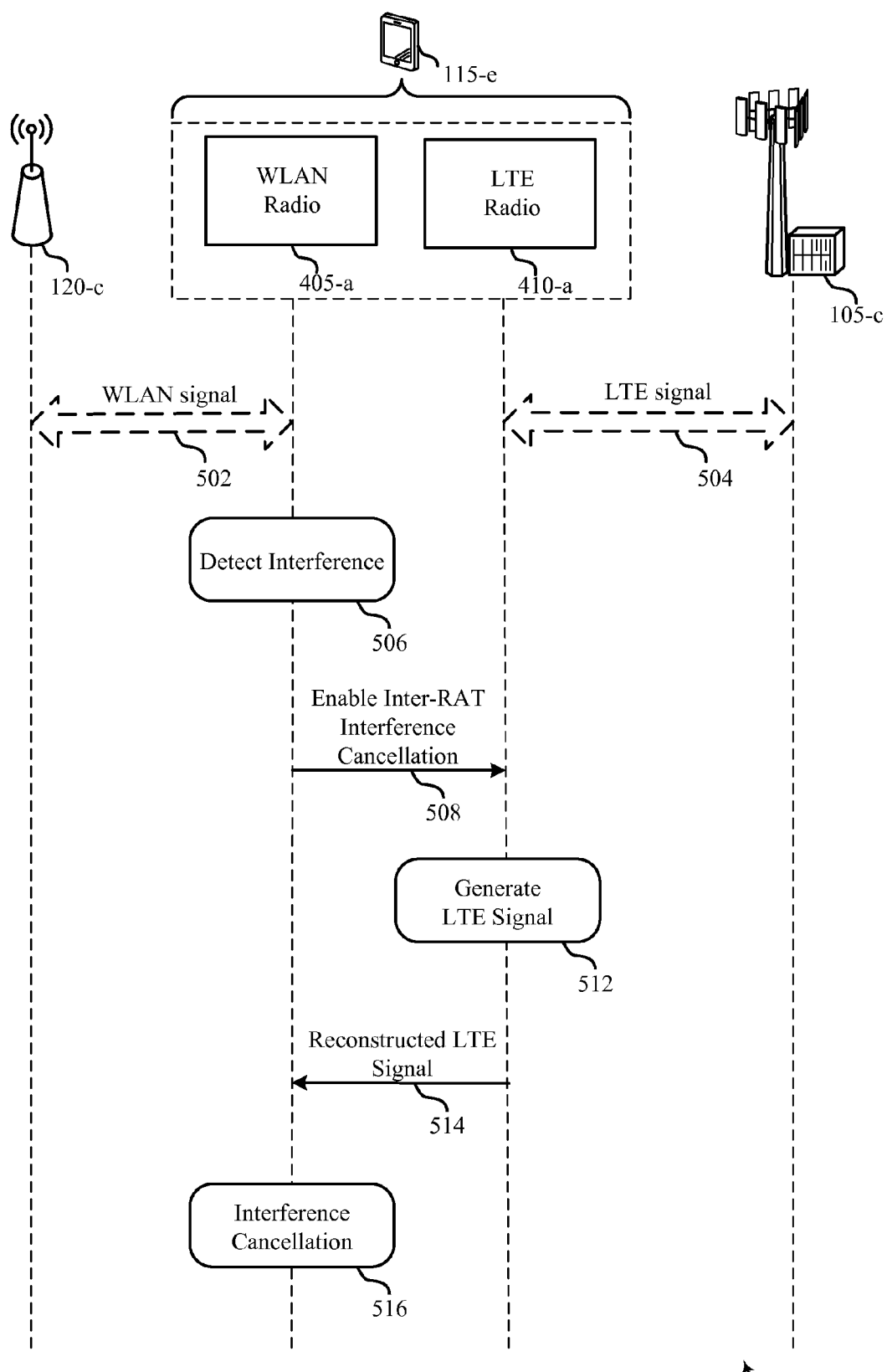
FIG. 5 illustrates an example of a message flow diagram for inter-RAT interference cancellation in accordance with various aspects of the present disclosure.

FIG. 5 illustrates an example of a communication system 500 for inter-RAT interference cancellation accordance with various aspects of the present disclosure. Communication system 500 may include a UE 115-e, which may be an example of a UE 115 described above with reference to FIGS. 1-2. In some examples, the UE 115-e may include a WLAN radio 405-a and LTE radio 410-a, which may be examples of WLAN radio 405 and LTE radio 410 described with reference to FIGS. 2-4, and which may include modems or receivers as described above with reference to FIG. 3. The communication system 500 may also include an access point 120-c and base station 105-c, which may be an examples of access point 120 and base station 105 described above with reference to FIGS. 1-4.

The WLAN radio 405-a and the LTE radio 410-a may communicate with the access point 120-c and base station 105-c over a shared or unlicensed spectrum. Thus, in some examples, the UE 115-*e* may receive WLAN signal(s) 502 and LTE signal(s) 504 that may overlap in time or frequency, and thus cause inter-RAT interference. For instance, the UE 115-*e*, upon receiving signals 502 and 504 may detect interference 506 at the WLAN radio 405-*a* and determine that the interference signal (e.g., LTE signal 504) exceeds a predetermined threshold level. As a result, the UE 115-*e* may request enablement of inter-RAT interference cancellation mode by transmitting a notification 508 from the WLAN radio 405-*a* to the LTE radio 410-*a* to assist with the interference cancellation.

Based on receiving the enablement notification 508, the LTE radio 410-*a* may generate the LTE signal 512 and transmit the reconstructed LTE signal 514 to the WLAN radio 405-*a*. In one or more example, the WLAN radio 405-*a* may identify the WLAN signal 502 based on the reception of the LTE signal 514 and remove the LTE signal 514 from the convoluted signal(s) to produce the WLAN signal free of any LTE signal.

Figure 6:
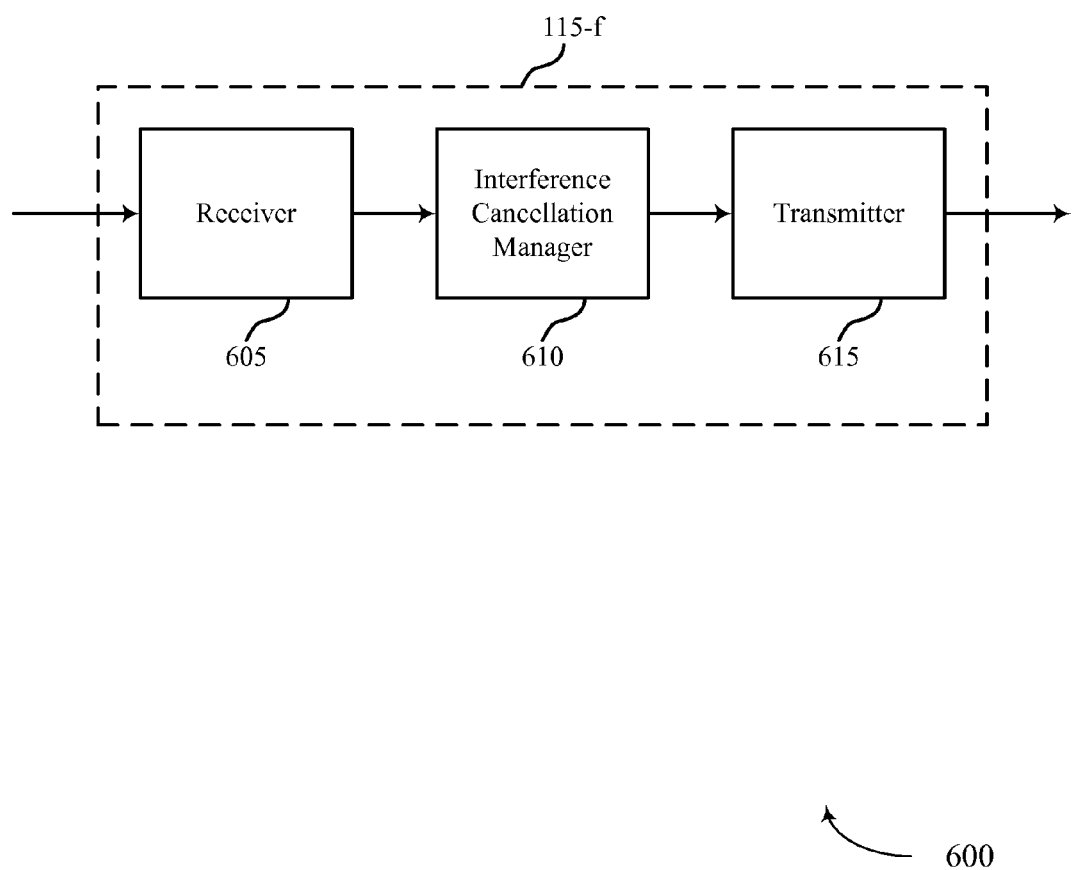
FIG. 6 shows a block diagram of a user equipment (UE) configured for inter-RAT interference cancellation in accordance with various aspects of the present disclosure.

FIG. 6 shows a block diagram 600 of a UE 115-*f* configured for inter-RAT interference cancellation in accordance with various aspects of the present disclosure. UE 115-*f* may be an example of aspects of a UE 115 described with reference to FIGS. 1-5. UE 115-*f* may include a receiver 605, an interference cancellation manager 610, or a transmitter 615. UE 115-*f* may also include a processor. Each of these components may be in communication with one another.

The receiver 605 may receive information such as packets, user data, or control information associated with various information channels (e.g., control channels, data channels, and information related to inter-RAT interference cancellation between LTE and WLAN, etc.). Information may be passed on to the interference cancellation manager 610, and to other components of UE 115-*f* In some examples, the receiver 605 may receive a convoluted signal comprising a plurality of RAT waveforms over a shared channel.

The interference cancellation manager 610 may receive a convoluted signal including a plurality of RAT waveforms over a shared channel, reconstruct a first signal of a first RAT waveform from the plurality of RAT waveforms with a first radio, and identify a second signal of a second RAT waveform from the plurality of RAT waveforms with a second radio based on the reconstructed first signal.

The transmitter 615 may transmit signals received from other components of UE 115-*f*. In some embodiments, the transmitter 615 may be collocated with the receiver 605 in a transceiver module. The transmitter 615 may include a single antenna, or it may include a plurality of antennas.

Figure 7:
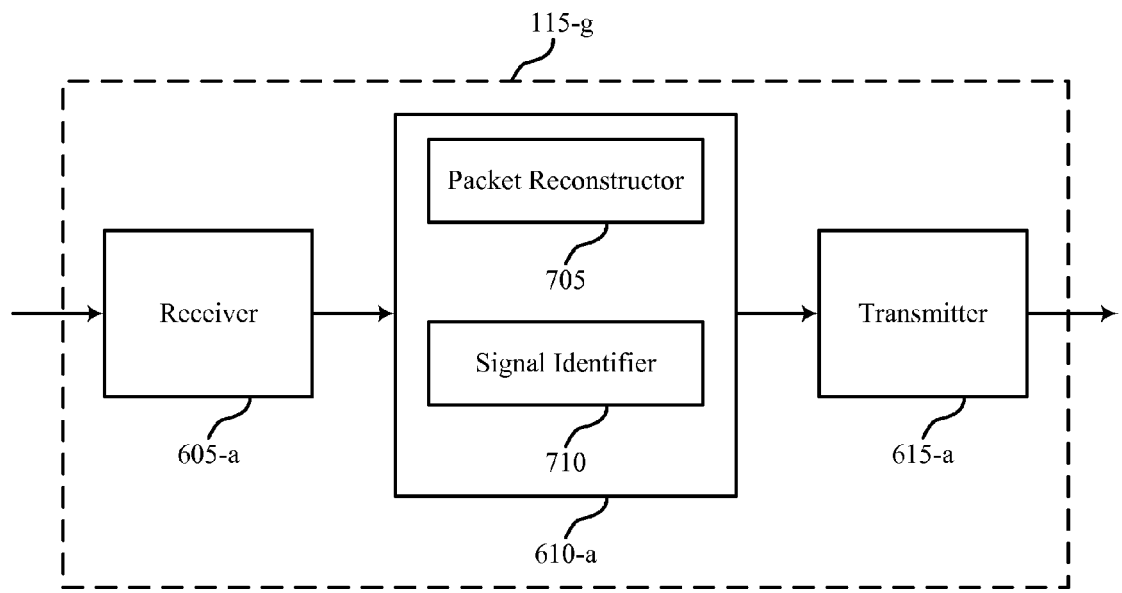
FIG. 7 shows a block diagram of a UE configured for inter-RAT interference cancellation in accordance with various aspects of the present disclosure.

FIG. 7 shows a block diagram 700 of a UE 115-*g* for inter-RAT interference cancellation between LTE and WLAN in accordance with various aspects of the present disclosure. UE 115-*g* may be an example of aspects of a UE 115 described with reference to FIGS. 1-6. UE 115-*g* may include a receiver 605-*a*, an interference cancellation manager 610-*a*, or a transmitter 615-*a*. UE 115-*g* may also include a processor. Each of these components may be in communication with one another. The interference cancellation manager 610-*a* may also include a packet reconstructor 705, and a signal identifier 710.

The receiver 605-*a* may receive information which may be passed on to interference cancellation manager 610-*a*, and to other components of UE 115-*g*. The interference cancellation manager 610-*a* may perform the operations described above with reference to FIG. 6. The transmitter 615-*a* may transmit signals received from other components of UE 115-*g*.

The packet reconstructor 705 may reconstruct a first signal of a first RAT waveform from the plurality of RAT waveforms with a first radio as described above with reference to FIGS. 2-5. In some examples, the first radio is or includes a modem, which includes a receiver and a packet reconstructor. In some examples, the first radio includes a WLAN modem. The first signal may be a WLAN signal and the second signal may be an LTE signal, for instance.

The signal identifier 710 may identify a second signal of a second RAT waveform from the plurality of RAT waveforms with a second radio based on the reconstructed first signal as described above with reference to FIGS. 2-5. In some examples, the second radio includes an LTE receiver.

Figure 8:
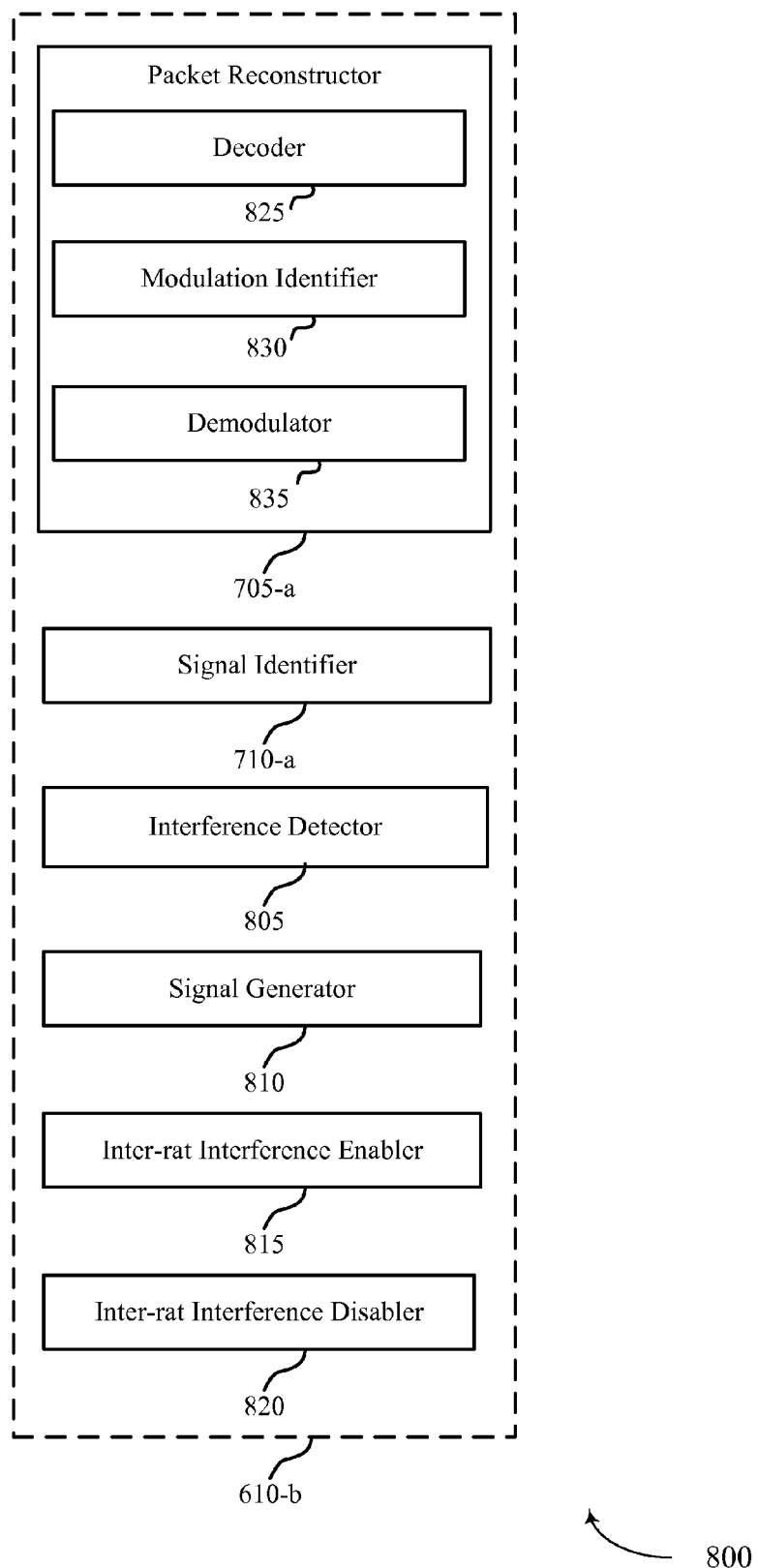
FIG. 8 shows a block diagram of an interference cancellation manager configured for inter-RAT interference cancellation in accordance with various aspects of the present disclosure.

FIG. 8 shows a block diagram 800 of an interference cancellation manager 610-*b* for inter-RAT interference cancellation in accordance with various aspects of the present disclosure. The interference cancellation manager 610-*b* may be an example of aspects of an interference cancellation manager 610 described with reference to FIGS. 6-7. The interference cancellation manager 610-*b* may include a packet reconstructor 705-*a*, and a signal identifier 710-*a*. Each of these modules may perform the functions described above with reference to FIG. 7. The interference cancellation manager 610-*b* may also include an interference detector 805, a signal generator 810, an inter-RAT interference enabler 815, an inter-RAT interference disabler 820, a decoder 825, a modulation identifier 830, and a demodulator 835.

The interference detector 805 may determine that an interference level associated with the convoluted signal is greater than or equal to a threshold as described above with reference to FIGS. 2-5. The interference detector 805 may also determine the interference level associated with the convoluted signal comprises identifying a SINR of the convoluted signal. The interference detector 805 may also determine that an interference level associated with the convoluted signal is less than a threshold.

The signal generator 810 may generate the reconstructed first signal of the first RAT waveform based on the determining as described above with reference to FIGS. 2-5. The signal generator 810 may also reconstruct with the first radio a portion of the convoluted signal to generate the first signal.

The inter-RAT interference enabler 815 may send an indication to generate the reconstructed first signal from the second radio to the first radio as described above with reference to FIGS. 2-5. In some examples, the inter-RAT interference disabler 820 may send an indication to cease signal reconstruction from the second radio to the first radio as described above with reference to FIGS. 2-5.

The decoder 825 may decode the convoluted signal with the first radio as described above with reference to FIGS. 2-5. The modulation identifier 830 may identify a modulation or coding scheme for the convoluted signal as described above with reference to FIGS. 2-5. Additionally or alternatively, the demodulator 835 may demodulate a portion of the convoluted signal based on the modulation or coding scheme as described above with reference to FIGS. 2-5.

The components of UE 115-*f*, UE 115-*g*, or interference cancellation manager 610-*b* may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 9:
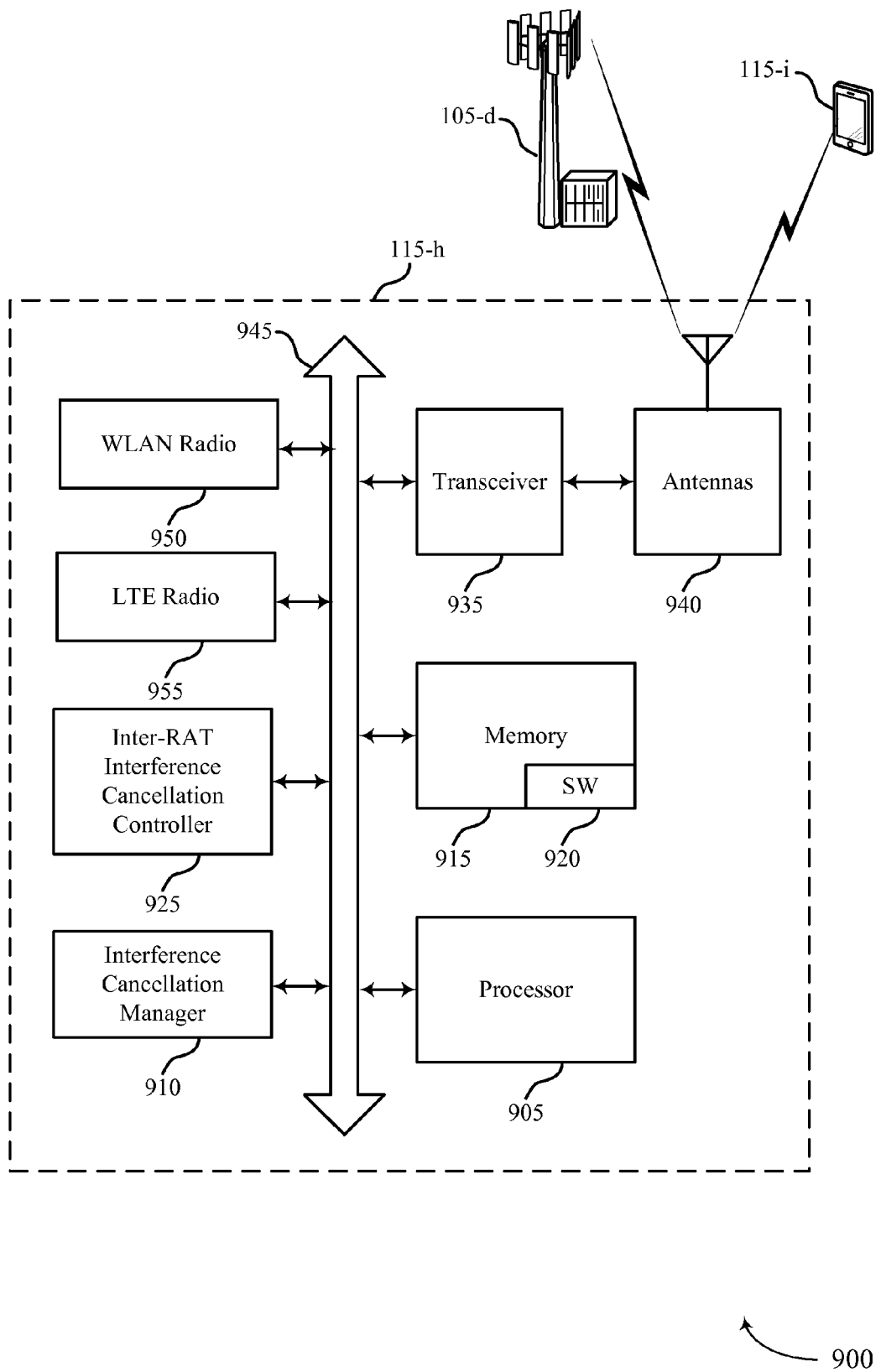
FIG. 9 illustrates a block diagram of a system including a UE configured for inter-RAT interference cancellation in accordance with various aspects of the present disclosure.

FIG. 9 shows a diagram of a system 900 including a UE 115 configured for inter-RAT interference cancellation in accordance with various aspects of the present disclosure. System 900 may include UE 115-h, which may be an example of a UE 115 described above with reference to FIGS. 1-8. UE 115-h may include an interference cancellation manager 910, which may be an example of an interference cancellation manager 610 described with reference to FIGS. 6-8. UE 115-h may also include an inter-RAT interference cancellation controller 925. UE 115-h may also include components for bi-directional voice and data communications including components for transmitting communications and components for receiving communications. For example, UE 115-h may communicate bi-directionally with UE 115-i or base station 105-d. The mobile device 115-h may also include a WLAN radio 950 and LTE radio 955, which may be examples of WLAN radio 405 and LTE radio 410 described with references to FIGS. 4-d. WLAN radio 950 and an LTE radio 955 may manage communications with other network devices, such as base station 105-d and AP 120 as shown in FIGS. 1-2, via the transceiver 935 and antennas 940.

The inter-RAT interference cancellation controller 925 may detect the level of interference experienced at the UE 115-h and determine whether to enable or disable the inter-RAT interference cancellation mode as described with reference to FIGS. 2-5. In some examples, the inter-RAT interference cancellation controller 925 may generate a message to notify a second co-located radio whether or not to reconstruct the interference signal and assist with interference cancellation. In other examples, the inter-RAT interference cancellation controller 925 may notify the second co-located radio to cease assistance of interference cancellation based on determination that the interference level is below a predetermined threshold.

UE 115-h may also include a processor module 905, and memory 915 (including software (SW) 920), a transceiver module 935, and one or more antenna(s) 940, each of which may communicate, directly or indirectly, with one another (e.g., via buses 945). The transceiver module 935 may communicate bi-directionally, via the antenna(s) 940 or wired or wireless links, with one or more networks, as described above. For example, the transceiver module 935 may communicate bi-directionally with a base station 105 or another UE 115. The transceiver module 935 may include a modem to modulate the packets and provide the modulated packets to the antenna(s) 940 for transmission, and to demodulate packets received from the antenna(s) 940. While UE 115-h may include a single antenna 940, UE 115-h may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor module 905 to perform various functions described herein (e.g., inter-RAT interference cancellation between LTE and WLAN, etc.). Alternatively, the software/firmware code 920 may not be directly executable by the processor module 905 but cause a computer (e.g., when compiled and executed) to perform functions described herein. The processor module 905 may include an intelligent hardware device, (e.g., a central processing unit (CPU), a microcontroller, an ASIC, etc.)

Figure 10:
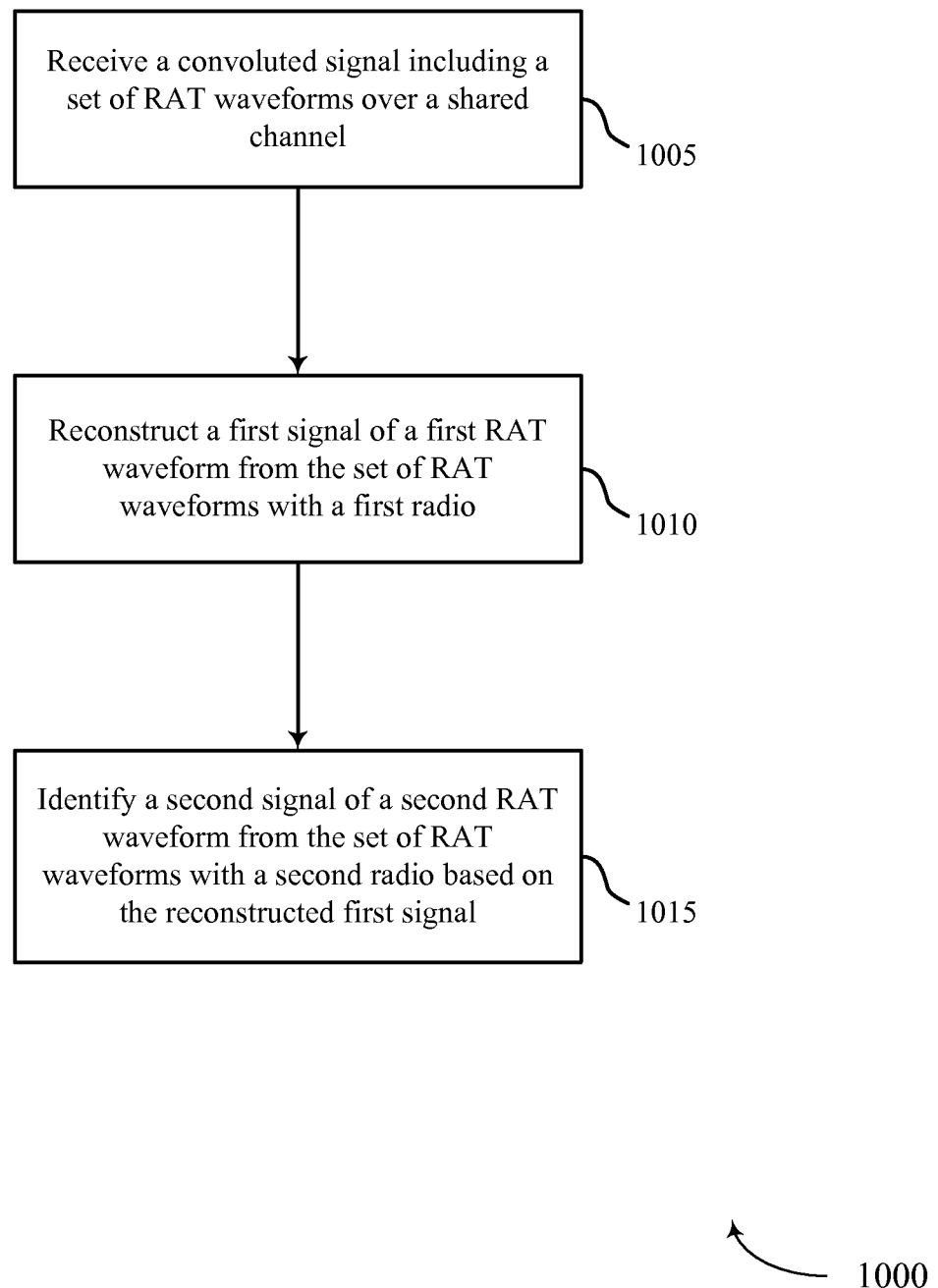
FIG. 10 shows a flowchart illustrating a method for inter-RAT interference cancellation in accordance with various aspects of the present disclosure.

FIG. 10 shows a flowchart illustrating a method 1000 for inter-RAT interference cancellation in accordance with various aspects of the present disclosure. The operations of method 1000 may be implemented by a UE 115 or its components as described with reference to FIGS. 1-9. For example, the operations of method 1000 may be performed by the interference cancellation manager 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware.

At block 1005, the UE 115 may receive a convoluted signal comprising a plurality of RAT waveforms over a shared channel as described above with reference to FIGS. 2-5. In certain examples, the operations of block 1005 may be performed by the receiver 605 as described above with reference to FIG. 6.

At block 1010, the UE 115 may reconstruct a first signal of a first RAT waveform from the plurality of RAT waveforms with a first radio as described above with reference to FIGS. 2-5. In certain examples, the operations of block 1010 may be performed by the packet reconstructor 705 as described above with reference to FIG. 7.

At block 1015, the UE 115 may identify a second signal of a second RAT waveform from the plurality of RAT waveforms with a second radio based on the reconstructed first signal as described above with reference to FIGS. 2-5. In certain examples, the operations of block 1015 may be performed by the signal identifier 710 as described above with reference to FIG. 7.

Figure 11:
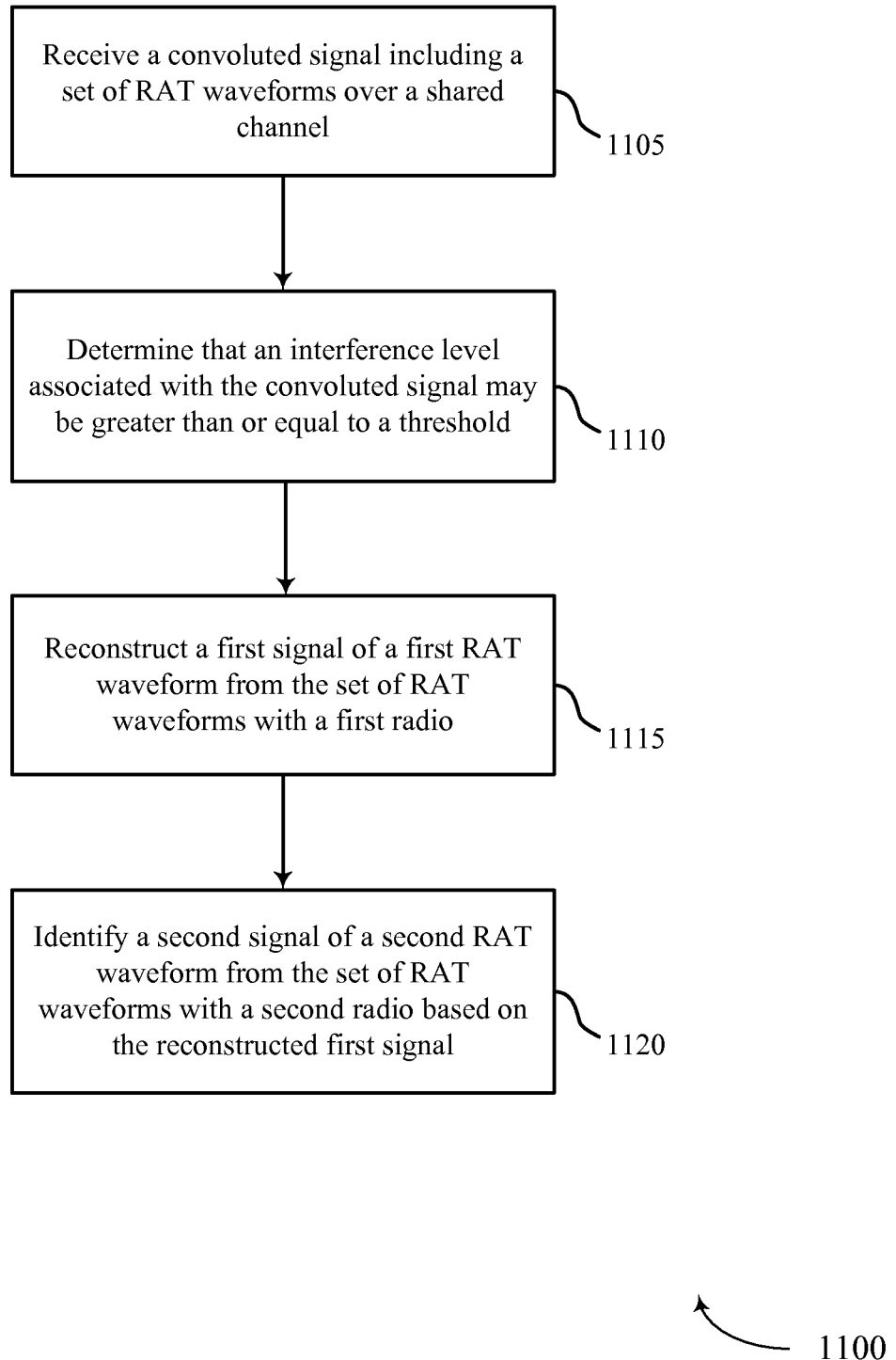
FIG. 11 shows a flowchart illustrating a method for inter-RAT interference cancellation in accordance with various aspects of the present disclosure.

FIG. 11 shows a flowchart illustrating a method 1100 for inter-RAT interference cancellation between LTE and WLAN in accordance with various aspects of the present disclosure. The operations of method 1100 may be implemented by a UE 115 or its components as described with reference to FIGS. 1-9. For example, the operations of method 1100 may be performed by the interference cancellation manager 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware. The method 1100 may also incorporate aspects of method 1000 of FIG. 10.

At block 1105, the UE 115 may receive a convoluted signal comprising a plurality of RAT waveforms over a shared channel as described above with reference to FIGS. 2-5. In certain examples, the operations of block 1105 may be performed by the receiver 605 as described above with reference to FIG. 6.

At block 1110, the UE 115 may determine that an interference level associated with the convoluted signal is greater than or equal to a threshold as described above with reference to FIGS. 2-5. In certain examples, the operations of block 1110 may be performed by the interference detector 805 as described above with reference to FIG. 8.

At block 1115, the UE 115 may reconstruct a first signal of a first RAT waveform from the plurality of RAT waveforms with a first radio as described above with reference to FIGS. 2-5. In certain examples, the operations of block 1115 may be performed by the packet reconstructor 705 as described above with reference to FIG. 7.

At block 1120, the UE 115 may identify a second signal of a second RAT waveform from the plurality of RAT waveforms with a second radio based on the reconstructed first signal as described above with reference to FIGS. 2-5. In certain examples, the operations of block 1120 may be performed by the signal identifier 710 as described above with reference to FIG. 7.

Figure 12:
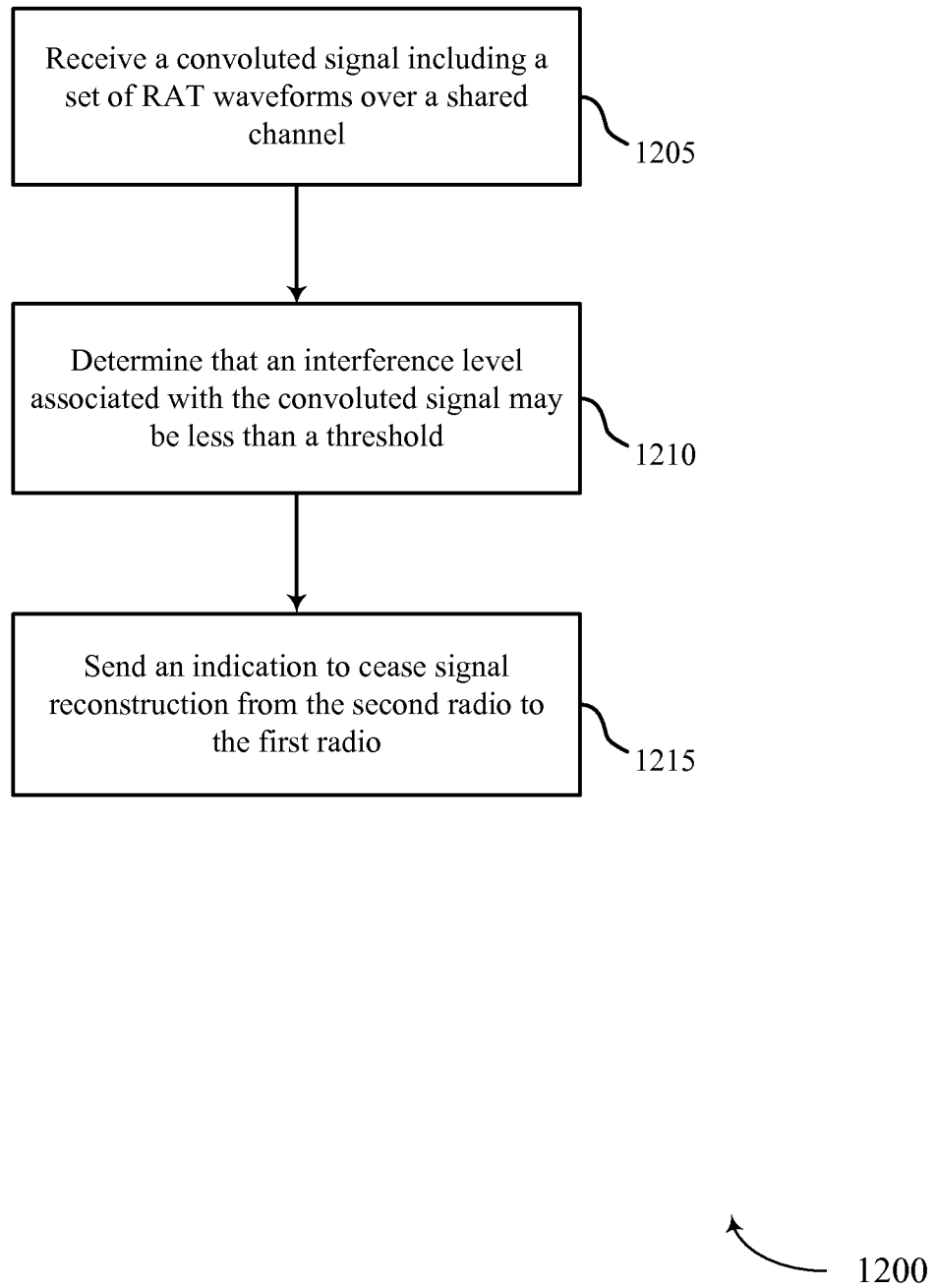
FIG. 12 shows a flowchart illustrating a method for inter-RAT interference cancellation in accordance with various aspects of the present disclosure.

FIG. 12 shows a flowchart illustrating a method 1200 for inter-RAT interference cancellation between LTE and WLAN in accordance with various aspects of the present disclosure. The operations of method 1200 may be implemented by a UE 115 or its components as described with reference to FIGS. 1-9. For example, the operations of method 1200 may be performed by the interference cancellation manager 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware. The method 1200 may also incorporate aspects of methods 1000, and 1100 of FIGS. 10-11.

At block 1205, the UE 115 may receive a convoluted signal comprising a plurality of RAT waveforms over a shared channel as described above with reference to FIGS. 2-5. In certain examples, the operations of block 1205 may be performed by the receiver 605 as described above with reference to FIG. 6.

At block 1210, the UE 115 may determine that an interference level associated with the convoluted signal is less than a threshold as described above with reference to FIGS. 2-5. In certain examples, the operations of block 1210 may be performed by the interference detector 805 as described above with reference to FIG. 8.

At block 1215, the UE 115 may send an indication to cease signal reconstruction from the second radio to the first radio as described above with reference to FIGS. 2-5. In certain examples, the operations of block 1215 may be performed by the inter-RAT interference disabler 820 as described above with reference to FIG. 8.

Figure 13:
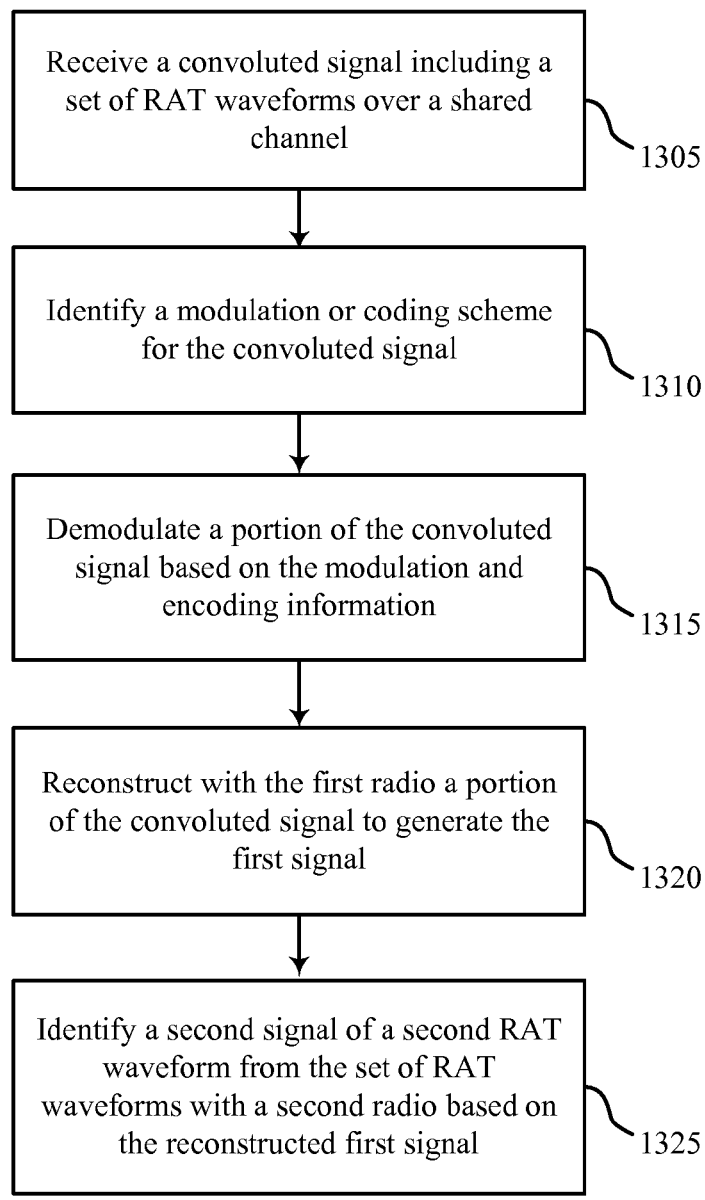
FIG. 13 shows a flowchart illustrating a method for inter-RAT interference cancellation in accordance with various aspects of the present disclosure.

FIG. 13 shows a flowchart illustrating a method 1300 for inter-RAT interference cancellation between LTE and WLAN in accordance with various aspects of the present disclosure. The operations of method 1300 may be implemented by a UE 115 or its components as described with reference to FIGS. 1-9. For example, the operations of method 1300 may be performed by the interference cancellation manager 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of methods 1000, 1100, and 1200 of FIGS. 10-12.

At block 1305, the UE 115 may receive a convoluted signal comprising a plurality of RAT waveforms over a shared channel as described above with reference to FIGS. 2-5. In certain examples, the operations of block 1305 may be performed by the receiver 605 as described above with reference to FIG. 6.

At block 1310, the UE 115 may identify a modulation or coding scheme for the convoluted signal as described above with reference to FIGS. 2-5. In certain examples, the operations of block 1310 may be performed by the modulation identifier 830 as described above with reference to FIG. 8.

At block 1315, the UE 115 may demodulate a portion of the convoluted signal based on the modulation or coding scheme as described above with reference to FIGS. 2-5. In certain examples, the operations of block 1315 may be performed by the demodulator 835 as described above with reference to FIG. 8.

At block 1320, the UE 115 may reconstruct with the first radio a portion of the convoluted signal to generate the first signal as described above with reference to FIGS. 2-5. In certain examples, the operations of block 1320 may be performed by the signal generator 810 as described above with reference to FIG. 8.

At block 1325, the UE 115 may identify a second signal of a second RAT waveform from the plurality of RAT waveforms with a second radio based on the reconstructed first signal as described above with reference to FIGS. 2-5. In certain examples, the operations of block 1325 may be performed by the signal identifier 710 as described above with reference to FIG. 7.

Thus, methods 1000, 1100, 1200, and 1300 may provide for inter-RAT interference cancellation between LTE and WLAN. It should be noted that methods 1000, 1100, 1200, and 1300, describe possible implementation, and that the operations and the steps may be rearranged or otherwise modified such that other implementations are possible. In some examples, aspects from two or more of the methods 1000, 1100, 1200, and 1300 may be combined.

The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile Communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
   receiving a convoluted signal comprising a plurality of radio access technology (RAT) waveforms over a shared channel;
   determining that an interference level associated with the convoluted signal satisfies a threshold;
   sending an indication to reconstruct a first signal of a first RAT waveform based on the determination that the threshold is satisfied, wherein the indication is sent to a first radio of the UE from a second radio of the UE;
   reconstructing the first signal of the first RAT waveform from the plurality of RAT waveforms with the first radio in response to the indication; and
   identifying a second signal of a second RAT waveform from the plurality of RAT waveforms with the second radio based on the reconstructed first signal.

2. The method of claim 1, wherein determining that the interference level associate with the convoluted signal satisfies the threshold comprises determining that the interference level associated with the convoluted signal is greater than or equal to the threshold.

3. The method of claim 2, wherein determining the interference level associated with the convoluted signal comprises identifying a signal-to-interference-plus-noise-ratio (SINR) of the convoluted signal.

4. The method of claim 1, further comprising:
   determining that the interference level associated with the convoluted signal is less than the threshold; and
   sending an indication to cease signal reconstruction from the second radio to the first radio.

5. The method of claim 1, further comprising:
   decoding the convoluted signal with the first radio; and
   reconstructing with the first radio a portion of the convoluted signal to generate the first signal.

6. The method of claim 5, wherein decoding the convoluted signal with the first radio comprises:
   identifying a modulation or coding scheme for the convoluted signal; and
   demodulating a portion of the convoluted signal based on the modulation or coding scheme.

7. The method of claim 1, wherein identifying the second signal comprises:
cancelling the reconstructed first signal of the first RAT waveform from the convoluted signal.

8. The method of claim 1, wherein the first radio comprises a receiver and a packet reconstructor.

9. The method of claim 1, wherein the first radio comprises a wireless local area network (WLAN) modem.

10. The method of claim 1, wherein the second radio comprises a Long Term Evolution (LTE) receiver.

11. The method of claim 1, wherein the first signal comprises a wireless local area network (WLAN) signal and the second signal comprises a Long Term Evolution (LTE) signal.

12. An apparatus for wireless communication at a user equipment (UE), comprising:
a receiver of a first radio configured to receive a convoluted signal comprising a plurality of radio access technology (RAT) waveforms over a shared channel;
an interference detector configured to determine that an interference level associated with the convoluted signal satisfies a threshold;
an inter-RAT interference enabler configured to send an indication to reconstruct a first signal of a first RAT waveform based on the determination that the threshold is satisfied, wherein the indication is sent to the first radio from a second radio;
a packet reconstructor of the first radio configured to reconstruct the first signal of the first RAT waveform from the plurality of RAT waveforms with the first radio in response to the indication;
a signal identifier of the second radio configured to identify a second signal of a second RAT waveform from the plurality of RAT waveforms based on the reconstructed first signal.

13. The apparatus of claim 12,
wherein the interference detector is configured to determine that the interference level associated with the convoluted signal is greater than or equal to the threshold.

14. The apparatus of claim 13,
wherein the interference detector is configured to determine that the interference level associated with the convoluted signal comprises identifying a SINR of the convoluted signal.

15. The apparatus of claim 12,
wherein the interference detector is configured to determine the interference level associated with the convoluted signal is less than a threshold; and wherein the apparatus further comprises:
an inter-RAT interference disabler configured to send an indication to cease signal reconstruction from the second radio to the first radio.

16. The apparatus of claim 12, further comprising:
a decoder of the first radio configured to decode the convoluted signal; and
a signal generator of the first radio configured to reconstruct a portion of the convoluted signal to generate the first signal.

17. The apparatus of claim 16, further comprising:
a modulation identifier configured to identify a modulation or coding scheme for the convoluted signal; and
a demodulator configured to demodulate a portion of the convoluted signal based on the modulation or coding scheme.

18. The apparatus of claim 12, further comprising:
an interference remover configured to cancel the reconstructed first signal of the first RAT waveform from the convoluted signal.

19. The apparatus of claim 12, wherein the first radio comprises a modem.

20. The apparatus of claim 12, wherein the first radio comprises a wireless local area network (WLAN) modem.

21. The apparatus of claim 12, wherein the second radio comprises a Long Term Evolution (LTE) receiver.

22. The apparatus of claim 12, wherein the first signal comprises a WLAN signal and the second signal comprises a LTE signal.

23. An apparatus for wireless communication at a user equipment (UE), comprising:
means for receiving a convoluted signal comprising a plurality of radio access technology (RAT) waveforms over a shared channel;
means for determining that an interference level associated with the convoluted signal satisfies a threshold;
means for sending an indication to reconstruct a first signal of a first RAT waveform based on the determination that the threshold is satisfied, wherein the means for sending the indication is operable to send the indication to a first radio of the UE from a second radio of the UE;
means for reconstructing the first signal of the first RAT waveform from the plurality of RAT waveforms with the first radio in response to the indication; and
means for identifying a second signal of a second RAT waveform from the plurality of RAT waveforms with the second radio based on the reconstructed first signal.

24. The apparatus of claim 23, further comprising:
means for determining that the interference level associated with the convoluted signal is greater than or equal to the threshold.

25. The apparatus of claim 24, wherein determining the interference level associated with the convoluted signal comprises identifying a SINR of the convoluted signal.

26. The apparatus of claim 23, further comprising:
means for determining that an interference level associated with the convoluted signal is less than a threshold; and
means for sending an indication to cease signal reconstruction from the second radio to the first radio.

27. A non-transitory computer-readable medium storing code for wireless communication at a user equipment (UE), the code comprising instructions executable to:
receive a convoluted signal comprising a plurality of radio access technology (RAT) waveforms over a shared channel;
determine that an interference level associated with the convoluted signal satisfies a threshold;
send, to a first radio of the UE from a second radio of the UE, an indication to reconstruct a first signal of a first RAT waveform based on the determination that the threshold is satisfied;
reconstruct the first signal of the first RAT waveform from the plurality of RAT waveforms with the first radio in response to the indication; and
identify a second signal of a second RAT waveform from the plurality of RAT waveforms with the second radio based on the reconstructed first signal.

* * * * *